(12) United States Patent
Dhayapule et al.

(10) Patent No.: US 10,067,993 B2
(45) Date of Patent: *Sep. 4, 2018

(54) POST-MIGRATION VALIDATION OF ETL JOBS AND EXCEPTION MANAGEMENT

(71) Applicant: International Business Machines Corporation, Armonk, NY (US)

(72) Inventors: Raghavendra R. Dhayapule, Bangalore (IN); Ritesh K. Gupta, Hyderabad (IN); Ajay Sood, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,038

(22) Filed: Aug. 11, 2016

(65) Prior Publication Data

US 2016/0350390 A1 Dec. 1, 2016

Related U.S. Application Data

(63) Continuation of application No. 13/960,048, filed on Aug. 6, 2013, now Pat. No. 9,449,060.

(51) Int. Cl.
*G06F 7/00* (2006.01)
*G06F 17/30* (2006.01)
*G06F 11/07* (2006.01)

(52) U.S. Cl.
CPC ...... *G06F 17/30563* (2013.01); *G06F 11/079* (2013.01); *G06F 17/30371* (2013.01); *G06F 17/30424* (2013.01)

(58) Field of Classification Search
CPC ....... G06F 17/30563; G06F 8/74; G06F 19/24
USPC .................. 707/602, 610, 641, 665, 999.101
See application file for complete search history.

(56) References Cited

U.S. PATENT DOCUMENTS

| | | | |
|---|---|---|---|
| 6,604,110 B1 * | 8/2003 | Savage | G06F 17/30563 707/602 |
| 7,058,615 B2 | 6/2006 | Yao | |
| 7,139,779 B1 * | 11/2006 | Kornelson | G06F 17/30563 |
| 7,373,350 B1 * | 5/2008 | Arone | G06F 17/30557 |
| 7,596,573 B2 | 9/2009 | O'Neil et al. | |

(Continued)

FOREIGN PATENT DOCUMENTS

EP 2079020 A1 7/2009

OTHER PUBLICATIONS

Eckerson, et al., "Evaluating ETL and Data Integration Platforms", TDWI Report Series, A 101communications Publication, The Data Warehousing Institute, Seattle, WA, 40 pages, provided by searcher in search report dated Jan. 17, 2012, <http://download.101com.com/tdwi/research_report/2003ETLReport.pdf>.

(Continued)

*Primary Examiner* — Mohammed R Uddin
(74) *Attorney, Agent, or Firm* — David B. Woycechowsky; Andrew Aubert (57) ABSTRACT

Handling extract-transform-load (ETL) job mismatches as "exceptions." Exception handling may include the following steps: (i) determining a mismatch while running an extract-transform-load job with the mismatch being a mismatch of at least one of the following types: design time information mismatch, and/or operational metadata mismatch; and (ii) responsive to determining the mismatch, handling the mismatch as an exception.

9 Claims, 8 Drawing Sheets

(56) References Cited

U.S. PATENT DOCUMENTS

| | | | |
|---|---|---|---|
| 7,814,470 B2 | 10/2010 | Mamou et al. | |
| 8,024,369 B2 | 9/2011 | Pellegrini et al. | |
| 8,417,715 B1* | 4/2013 | Bruckhaus | G06F 17/30994 705/26.1 |
| 8,595,703 B2* | 11/2013 | van Gogh | G06F 11/3604 714/38.1 |
| 8,688,625 B1* | 4/2014 | Clark | G06Q 10/00 707/602 |
| 9,031,901 B1* | 5/2015 | King | G06F 12/0802 707/602 |
| 9,158,827 B1* | 10/2015 | Vu | G06F 17/30563 |
| 2003/0126152 A1* | 7/2003 | Rajak | G06F 17/30607 |
| 2004/0249644 A1* | 12/2004 | Schiefer | G06Q 10/06375 705/7.37 |
| 2004/0260696 A1* | 12/2004 | Matsuoka | G06Q 10/10 |
| 2005/0187991 A1* | 8/2005 | Wilms | G06F 17/30563 |
| 2005/0243604 A1* | 11/2005 | Harken | G06F 8/51 365/185.22 |
| 2005/0256892 A1* | 11/2005 | Harken | G06F 17/303 |
| 2006/0271528 A1* | 11/2006 | Gorelik | G06F 17/30292 |
| 2007/0074155 A1* | 3/2007 | Ama | G06F 17/30563 717/106 |
| 2007/0136324 A1* | 6/2007 | Xu | G06F 17/30563 |
| 2007/0179939 A1* | 8/2007 | O'Neil | G06F 17/3056 |
| 2007/0255741 A1* | 11/2007 | Geiger | G06F 17/30525 |
| 2008/0071844 A1* | 3/2008 | Gopal | G06F 17/30563 |
| 2009/0037488 A1* | 2/2009 | Abrams | G06F 17/30569 |
| 2009/0063534 A1 | 3/2009 | Halberstadt | |
| 2009/0177671 A1* | 7/2009 | Pellegrini | G06F 9/5038 |
| 2009/0282042 A1 | 11/2009 | Russell et al. | |
| 2010/0281061 A1* | 11/2010 | Chen | G06F 17/30371 707/794 |
| 2011/0246415 A1* | 10/2011 | Li | G06F 17/30592 707/602 |
| 2012/0054147 A1* | 3/2012 | Goetz | G06F 17/30563 707/602 |
| 2012/0254103 A1* | 10/2012 | Cottle | G06F 17/30563 707/602 |
| 2012/0265726 A1* | 10/2012 | Padmanabhan | G06F 17/303 707/602 |
| 2012/0271865 A1 | 10/2012 | Jin et al. | |
| 2012/0290527 A1* | 11/2012 | Yalamanchilli | G06F 17/30592 707/602 |
| 2012/0296862 A1 | 11/2012 | Duda et al. | |
| 2014/0040182 A1* | 2/2014 | Gilder | G06F 17/30578 707/602 |
| 2014/0310231 A1* | 10/2014 | Sampathkumaran | G06F 17/30563 707/602 |
| 2015/0020049 A1* | 1/2015 | Caufield | G06F 11/3684 717/124 |
| 2015/0026136 A1* | 1/2015 | Rathod | G06F 17/30082 707/692 |
| 2015/0046389 A1 | 2/2015 | Dhayapule et al. | |

OTHER PUBLICATIONS

Harris, et al., "A flexible data integration architecture using InfoSphere DataStage and InfoSphere Federation Server", Oct. 4, 2012 (Published Mar. 22, 2007), 25 pages, <http://www.ibm.com/developerworks/data/library/techarticle/dm-0703harris/>.

Holmes et al., "Monitoring and Analyzing Service-Based Internet Systems through a Model-Aware Service Environment", 15 pages, provided by searcher in search report dated Jan. 17, 2012, <http://publications.taid.holmes.at/conf/caise/2010/monitoring.pdf>.

"A real-time method using data mining to improve root cause analysis in parallel ETL streams buffering suspicious data", ip.com, An IP.com Prior Art Database Technical Disclosure, IP.com No. IPCOM000204404D, Feb. 23, 2011, 6 pages.

"Extract, transform, load", Wikipedia, the free encyclopedia, page last modified on May 7, 2013 at 20:26, 9 pages, <http://en.wikipedia.org/w/index.php?title=Extract,_transform,_load&oldid=554016375>.

"System and Methods to Dynamically create ETL processes, execute them remotely and consume its report in alternate process(es)", ip.com, An IP.com Prior Art Database Technical Disclosure, IP.com No. IPCOM000222901D, Oct. 29, 2012, 9 pages.

* cited by examiner

POST-MIGRATION VALIDATION OF ETL JOBS AND EXCEPTION MANAGEMENT

FIELD OF THE INVENTION

The present invention relates generally to the field of extract-load-transform (ETL) data integration jobs and more particularly to validation of design time information and runtime operational metadata of ETL jobs after a migration.

BACKGROUND OF THE INVENTION

"Extract-transform-load" data integration jobs are known. Roughly speaking, Extract-Transform-Load (ETL) refers to a process in database usage, and especially in data integration, that involves: (i) extracting data from outside source database(s) (see definition, below, in Definitions sub-section of detailed description section); (ii) transforming the extracted data to fit operational requirements (for example, quality levels); and (iii) loading the transformed data into the target database (see definition, below, in Definitions subsection of detailed description section). During the transform phase, the data being transformed to appropriate form and format for the target database(s) is subject to validation based upon validation rules. If validation fails, it may result in a rejection of the data, such that an incomplete data set proceeds to the load phase. These validation failures are called exceptions. One example of an exception encountered during validation is when a code translation parses an unknown code in the extracted data. At the time of validation, the range of data values or data quality in the source and/or target database(s) may exceed the expectations of designers. Data profiling of a source database during data analysis can identify the data conditions that will require management by the transform rules. Data profiling can also lead to revisions in the validation rules implemented in the ETL process.

Typically an ETL Process (that is, unit of work) is designed to accomplish the following: (i) extract and cleanse the data from the source database; (ii) transform the data into a desired format that can be consumed in the subsequent extraction phase; and (iii) loading the data to a target database. Typically, transform phase (ii) applies the core business logic to convert data into information. Subsequent to load phase (iii), the data of the target database is used by a reporting engine for deriving insights out of the transformed data. There are two complete sets of Life Cycles that a job in ETL process undergoes: (i) porting/migration/upgrades of jobs from an older version to the newer version of the ETL product; and (ii) movement of jobs from development to quality assurance to production, which is typically movement across the same version.

Exception handling is the process of responding to exceptions that occur during computer processing. Exceptions are anomalous or exceptional events requiring special processing, sometimes changing the flow of program execution. Exception handling is typically provided by specialized programming language constructs or computer hardware mechanisms. In general, an exception is resolved by: (i) saving a current state of execution in a predefined location; and (ii) switching the execution to a specific subroutine known as an "exception handler." On condition that an exception is "continuable," the handler may later resume the execution at the original location using the saved information. Alternative approaches to exception handling in software include: (i) error checking (maintains normal program flow with later explicit checks for contingencies reported using special return values, and floating point status flags); and (ii) input validation (preemptively filters exceptional cases).

SUMMARY

According to an aspect of the present invention, a method includes the following steps: (i) determining a mismatch while running an extract-transform-load job with the mismatch being a mismatch of at least one of the following types: design time information mismatch, and/or operational metadata mismatch; and (ii) responsive to determining the mismatch, handling the mismatch as an exception.

DETAILED DESCRIPTION

This DETAILED DESCRIPTION section will be divided into the following subsections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
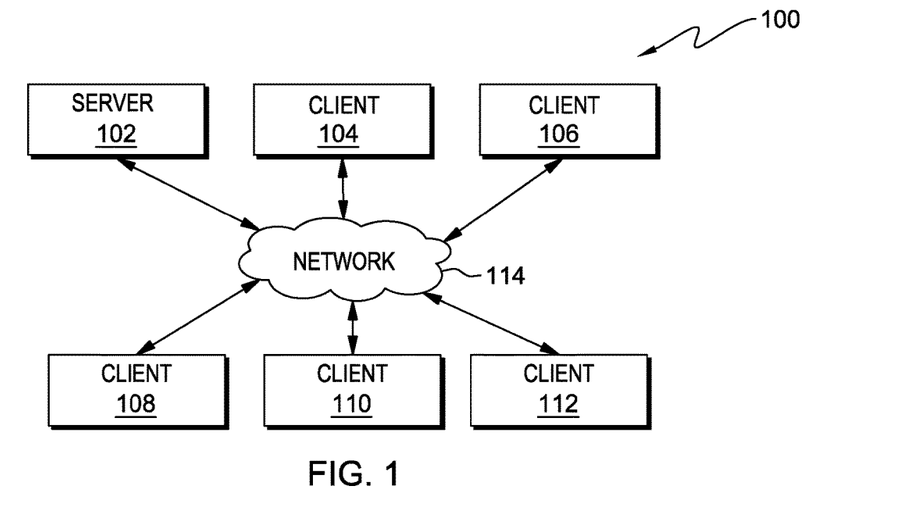
FIG. 1 is a schematic view of a first embodiment of a computer system (that is, a system including one or more processing devices) according to the present invention.
Figure 2:
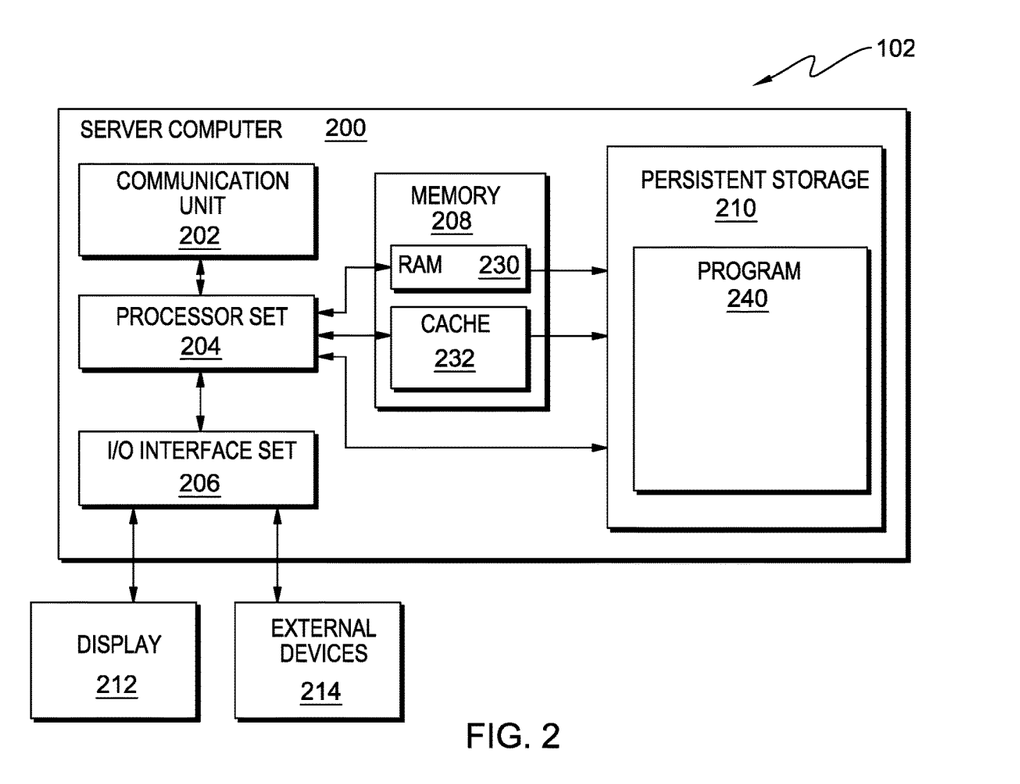
FIG. 2 is a schematic view of a computer sub-system (that is, a part of the computer system that itself includes a processing device) portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client subsystems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
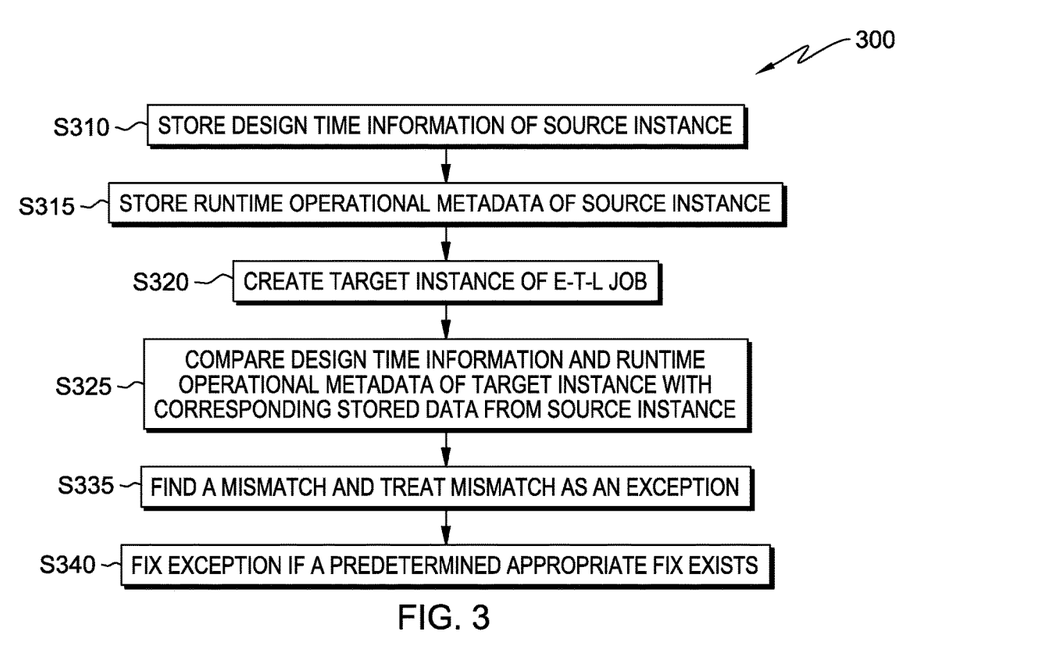
FIG. 3 is a flowchart showing a process performed, at least in part, by the first embodiment computer system.
Figure 4:
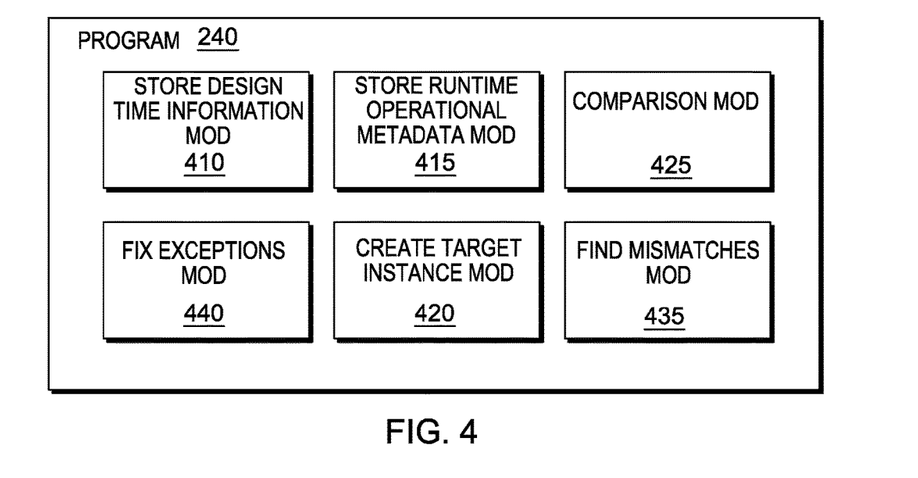
FIG. 4 is a schematic view of a portion of the first embodiment computer system.

FIG. 3 shows a flow chart 300 depicting a method according to the present invention. FIG. 4 shows program 240 for performing at least some of the method steps of flow chart 300. This method and associated software will now be discussed, over the course of the following paragraphs, with extensive reference to FIG. 3 (for the method step blocks) and FIG. 4 (for the software blocks).

At some point prior to step S310 a source instance of an ETL job (that is, source database(s) or source data store(s)) is created. An ETL tool provides a mechanism to create ETL jobs, compile them and provides an environment to run the developed and compiled jobs. Typically, the ETL tool is installed on a machine or several such instances of an ETL tool are installed on a single machine. In method 300, there are two instances of an ETL tool (not separately shown in the Figures) and the job(s) that were developed in one ETL tool instance are migrated to another ETL instance. The former instance is termed as "source instance" and the latter instance as the "target instance." In this sense, the creation of source instance is not considered part of the ETL job, but the ETL job uses the source instance as an input.

Processing begins at step S310 where store design time information mod 410 stores design time information associated with the source instance of the ETL job. Design time information is the information of the job that is created in an ETL tool and saved in the repository. Below are some of the design information of a typical ETL job: (i) job name; (ii) job type; (iii) job parameters; (iv) number of stages; (v) stage types; (vi) stage properties; (vii) links in the jobs; (viii) link meta data; (ix) database schema.

Processing proceeds to step S315 where store runtime operational metadata mod 415 stores runtime operational metadata associated with the source instance of the ETL job. The job run artifacts of an ETL job are termed as runtime operational metadata. Some typical examples of kinds of runtime operational metadata are as follows: (i) job name and invocation id; (ii) job run parameters and their values; (iii) runtime environment variables; (iv) row count for links; (v) job elapsed time; (vi) job status; (vii) job log; and/or (viii) number of messages.

Processing proceeds to step S320 where create target instance mod 420 creates the target instance of the ETL job. Alternatively, in some methods according to the present disclosure, the software of the present invention does not create target instance, and the target instance exists already before process 300 is begun. Some embodiments of the present disclosure only perform comparison and validation of ETL jobs (design info and runtime operational metadata) on two ETL tools (instances) after a migration from source to target has already occurred. There are many reasons companies do ETL jobs. One typical example is when company A acquires/merges with company B, company A maintains all its databases in one data storage system, and company B maintains its data in some other data storage system. So, in order to have consolidated data, they extract the data from A and B databases then transform it to single view and load to another database. Another example is when companies have different departments, and each department may have its own database system, so to have a consolidated view, they create ETL jobs. Many of applications continue generating data in one format (text files, older databases, etc.) and to consume this data in other applications, companies use ETL jobs. In some embodiments of the present disclosure, ETL jobs are used as middleware.

Processing proceeds to step S325 where comparison mod 425 compares the stored design time information and runtime operational metadata (stored at steps S310 and S315) to design time information and runtime operational metadata of the target instance of the ETL job.

Processing proceeds to step S335 where comparison mod 425 finds a mismatch in the design time information and/or the runtime operational metadata and find mismatches mod 435 treats this mismatch as an "exception." In a typical enterprise, there could be hundreds of ETL jobs running in ETL infrastructure (source machine/instance). When the enterprise upgrades the ETL tool to a later version or wants to move to QA (quality assurance) or production (target machine/instance), the existing jobs in the source need to be migrated to the target machine. In an ideal scenario, the migration should move every job and related artifacts from source to target and the jobs, in target, should run in the same way as that of the source instance. Because the ETL jobs and the environment are complex in nature, enterprises encounter various issues after the migration from source to target, and some embodiments of the present disclosure can address these issues. Some embodiments of the present invention provide a method to validate the migration by comparing the job designs from source and target and also comparing the runtime operational metadata. During this comparison, if there is any difference found, the difference is treated as an exception. Some embodiments of the present disclosure: (i) fix the issue using a target repository if it is a design difference; and (ii) identify the root cause of the issue (and fix it if there is a known appropriate fix method) if it is a runtime issue.

Processing proceeds to step S340 where fix exceptions mod 440 fixes the exception found at step S335 if a predetermined fix is known and available. In this embodiment, this fix is applied automatically by software and without substantial human intervention. There are two types of mismatches: (i) job design mismatches; and (ii) job runtime mismatches. These two types will respectively be discussed in the following two paragraphs.

With respect to job design mismatches, once any of the job design attributes on target does not match with that of the source, in order to fix this, the source side data is collected for that attribute and the target repository is updated. For example, while comparing, it is found that the value for a particular job parameter is different in target, then the exception management module fixes this by updating the target repository for this job parameter with the source side value.

With respect to job runtime mismatches, the handling of runtime issues is different than that of design issues. When a particular job that runs successfully in source fails to run in target, this is an issue. So the main cause of the issue is identified and a fix is made (or at least attempted). For example, consider a job that extracts data from some data base, transforms the data and writes to a file in the file system. If the location/directory where the file must be created for the transformed data is not writable, then the job fails with permission denied error. This issue can then be fixed by invoking appropriate software (not shown) which changes the directory permissions.

III. Further Comments and/or Embodiments

The present invention recognizes that in a value-conscious environment, Management, IT (information technology) Heads and Managers all are leading information-centric projects to transform their business and deliver cost savings. Data integration, warehousing and master data management (MDM) projects enable effective cross-promotions by providing greater insight about clients and prospects. Even though these applications improve the performance of mission critical customer-related software-based systems, maintaining them can be costly. The present invention further recognizes that the validation process in cases of ETL migration from one system to another system is conventionally at least partially a manual process. The present invention further recognizes the following ETL-job-related challenges: (i) migrating ETL projects/jobs from older version or from development to quality assurance to a later or new version/production can be a time consuming and costly effort; (ii) the number of jobs here could be as large as several thousands; (iii) enterprises do not use any new version of the ETL product until they have confidence that the jobs are migrated properly and they are producing the same results as that of the old version; (iv) before a job in the ETL process is deployed in the production environment, management must have the confidence that it behaved in the same way as in the development and/or quality assurance environment; and (v) the version from which the migration is happening could be available at the time of validation or may not be available.

Some embodiments of the present disclosure provide a tool or product that will compare the design and runtime operational metadata of jobs in two different instances of ETL product. The two instances here could be same version or different versions. In some embodiments, the tool also handles exception management in case of mismatches. Some embodiments of the present disclosure have one or more of the following characteristics, advantages and/or features: (i) users are afforded the opportunity to find mismatches in design time information and run time operational metadata for ETL jobs; (ii) mismatches are handled as exceptions; (iii) users are provided with ways to fix the exceptions; (iv) design time and runtime operational metadata are compared; and/or (v) exception management support is provided. Some relevant terminology will now be defined: (i) source machine is a machine where the jobs/projects undergoing migration are located; (ii) target machine is a machine to which the jobs/projects are being migrated.

Some embodiments of the present disclosure have one or more of the following features, characteristics and/or advantages: (i) involve the validation of the design time and run time operational metadata information of migrated jobs; (ii) automatically handle the exceptions; (iii) correct the job design differences in the target; (iv) correct the possible runtime failures based on intelligent analysis of design and runtime operational metadata; and (v) maintain a repository of runtime failures and the related fix for the same. With regard to item (v) in the previous sentence, in some embodiments, the repository will be incremental in nature, and if any new failure and fix is identified in the future, then this information is added to the repository.

In some embodiments, the job design information includes: job name, job type, job parameters, parameter types and default values, short description, long description, number of stages, stage names, stage type, stage properties, number of links, link names, data locators, etc. In some embodiments, the job runtime operational metadata includes: job name, invocation identification number (id), runtime parameters, row count for each link, elapsed time, job log, etc.

In some embodiments, analysis of the design time information of jobs is accomplished by a straight forward mechanism as follows: (i) fetch the source side and target side information, (ii) compare the data; and (iii) correct the failures in the target repository.

The analysis of runtime failures presents certain challenges as follows: (i) parsing the runtime log to get the failure; and (ii) based on failure that has been determined, finding out the root cause of the failure. Some of the common scenarios are discussed in the following paragraphs.

One type of failure (herein called "environment variable failure") occurs when a job depends on some OS (operating system) environment variable, and the job fails or produces wrong results because either: (i) it could not find the environment variable in the target; or (ii) the environment variable has a target value that is different than the source value. To identify this type of problems, the software performs the following actions: (i) parsing the source side job log to collect all the runtime job parameters and their values for this particular job; (ii) similarly parsing the target side runtime job log to effectively fetch the job parameters and values; and (iii) determining if there are any discrepancies between items (i) and (ii). In some embodiments of the present disclosure, software parses the target side job log and collects the job parameters and values from the log. Environment variable failures can be fixed by modifying the environment variable and running the job again to see if it produces the same results or not.

Another type of failure (herein called an "output folder failure") occurs when a job produces output to a file and in the target machine this output folder is not writable. To identify this problem the software: (i) parses the log to identify the failure by determining from the log that the folder is not writable; (ii) corrects the permissions; and (iii) runs the job again.

Another type of failure (herein called a "missing file failure") occurs when a job references a file which doesn't exist in the target. When the software encounters a missing file failure, it reports this problem to the user.

Figure 5:
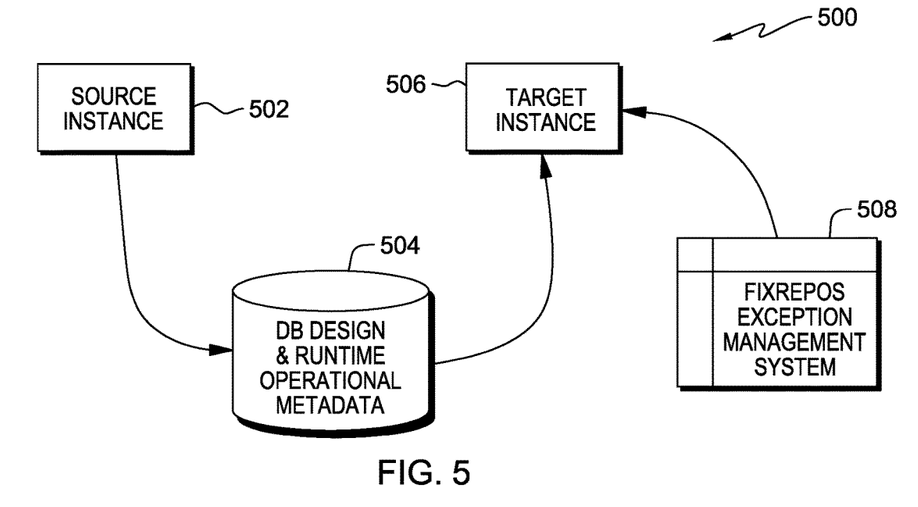
FIG. 5 is a schematic view of a second embodiment of a computer system according to the present invention.

As shown in FIG. 5, architectural diagram 500 for an embodiment of the present disclosure includes: source instance block 502; database 504 (which stores design and runtime operational metadata); target instance block 506; and fixrepos block 508 (which represents an exception management system). Database 504 receives source side design and runtime operational metadata from source block 502. Target instance block compares the source side design and runtime operational metadata to information about the target data store(s). Fixrepos block 508 fixes any mismatches determined by block 506 by calling an appropriate fix method.

Figure 6A:
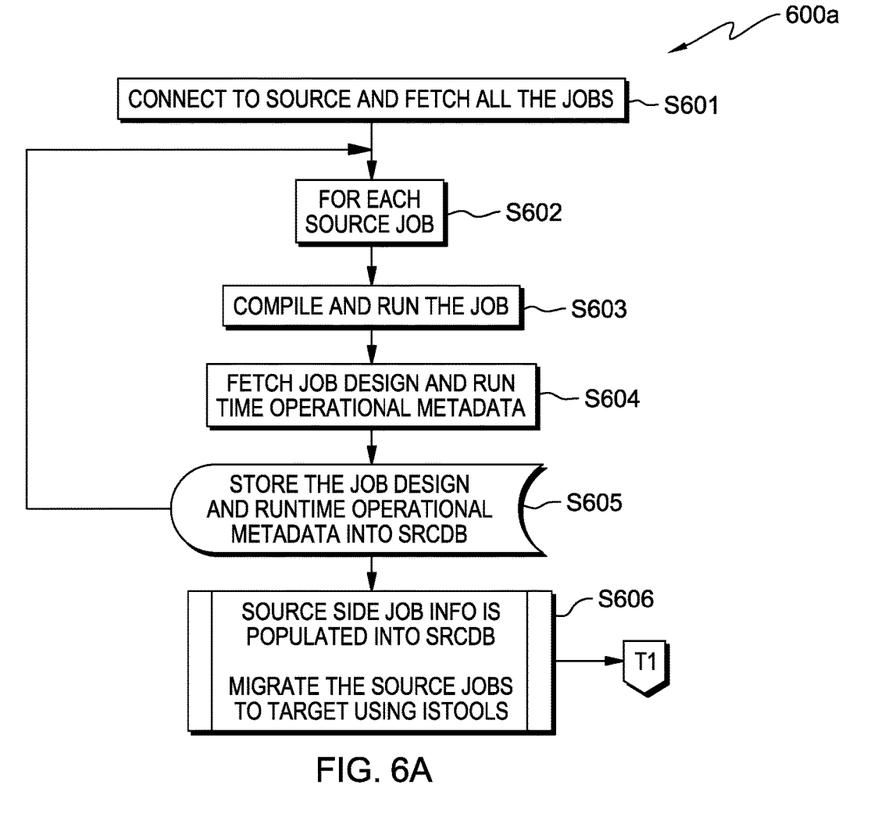
FIGS. 6A, 6B and 6C together make up a flowchart showing a process performed, at least in part, by the second embodiment computer system.
Figure 6B:
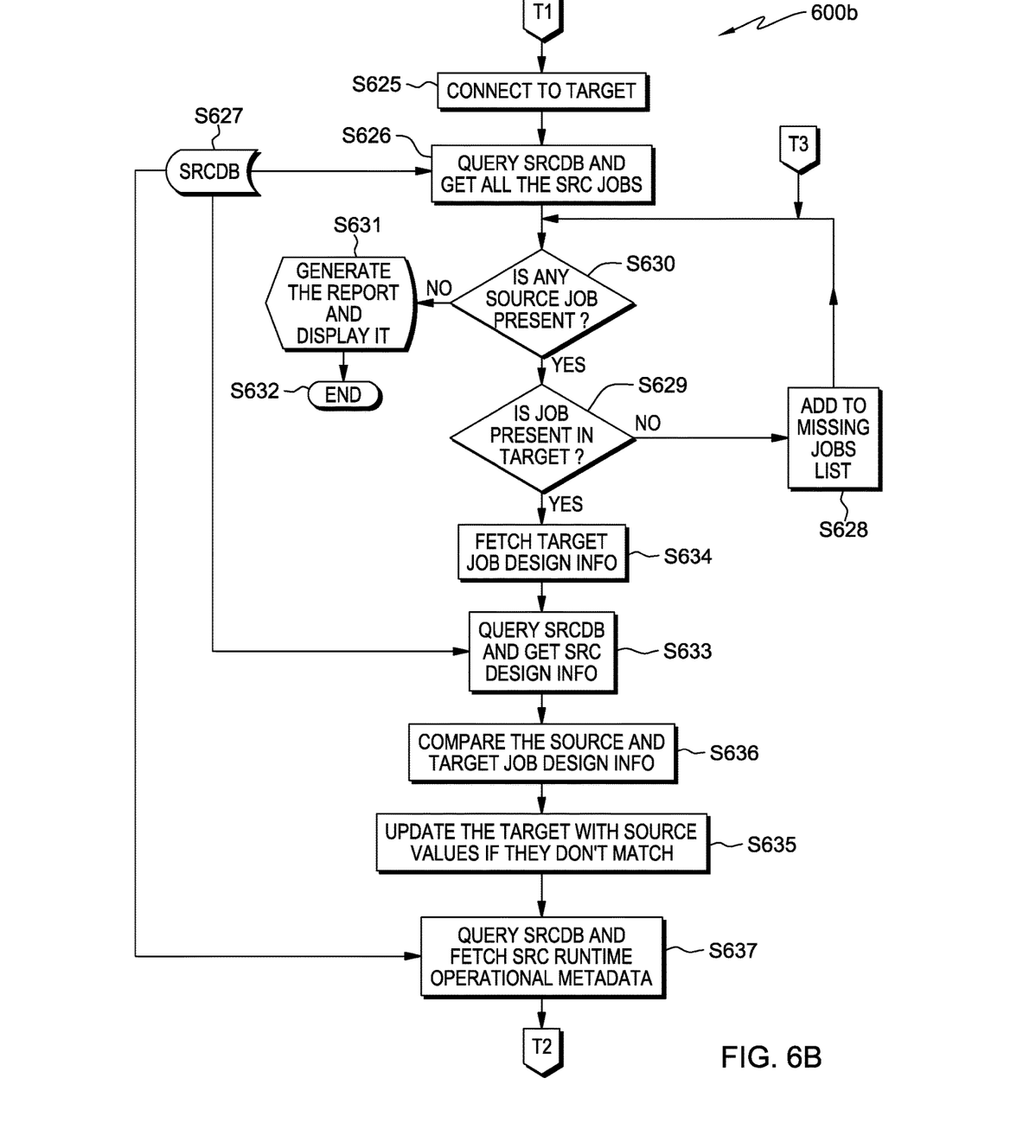
Figure 6C:
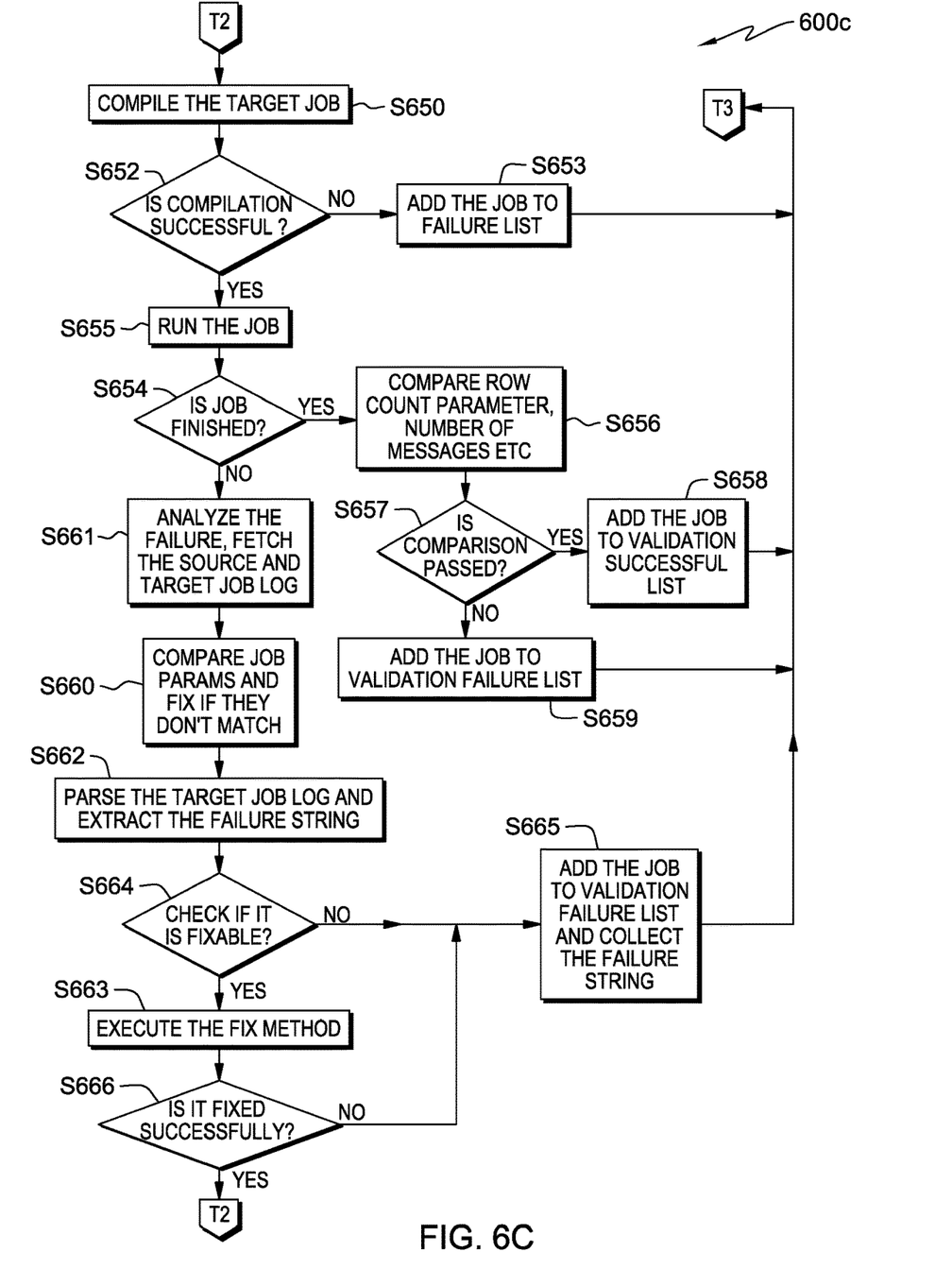

As shown in FIGS. 6A (first portion 600a, including steps S601 to S606), 6B (second portion 600b, including steps S625 to S637) and 6C (third portion 600c, including steps S650 to S666), flowchart 600 represents a high level algorithm with process flow as shown by the arrows in the Figures and process juncture points T1, T2 and T3.

This process is described in narrative text form as follows: (i) connect to the source project with the supplied credentials and fetch all the jobs; (ii) for each of the jobs above, perform the steps S603 to S605; (iii) compile and run the job (in case the job does not compile, it will be recorded as a failure and reported appropriately; (iv) fetch the job design and runtime operational metadata (for the job design information, the repository containing the design information is queried to fetch the runtime operational metadata using available APIs ("application programming interface"); (v) load the fetched data into source database ("SRCDB") as a database or a file (for example, a file in JSON ("JavaScript Object Notation") format); (vi) migrate the jobs from the source machine to the target machine using the recommended approach (this will vary depending upon the ETL program in use); (vii) connect to target machine with the supplied credentials; (viii) query the source database and get the list of all source job names; (ix) for each of the job name in the above list, perform the corresponding steps for that source job name; (x) check whether the job is present in the target machine or not, if it is available then proceed further, otherwise add this job name to the list of missing jobs to build the report; (xi) fetch the design information of the job from the target machine; (xii) query the source database and get the source side design information for this particular job; (xiii) compare the target and source side design information, if there are any exceptions, that is, if some of the source side attributes do not match with target then update the target with source values; (xiv) fetch the source side run time operational metadata details from the source database (it is assumed that the source side job is finished and giving appropriate results per the business logic, in case it is found that the source job is not finished then there is nothing to validate in this case and add to the report saying "Source job is not finished"; (xv) compare the source and target run time operational metadata details, perform the Step XV Sub-Steps identified and discussed in the following paragraph; (xvi) collect the details of all the values which don't match to build a report later; (xvii) generate a detailed report with all the failures; (xviii) display the report and exit the application.

The Step XV Sub-Steps, a to g are as follows: (a) compile the job in the target, if the compile fails, then add this to the list of failures and continue; (b) run the target job and fetch the runtime operational metadata details of the job; (c) compare the status of source job (finished) with the target job, if they match then compare the runtime operational metadata like row count, job parameters, elapsed time, number of messages etc. and if they match, mark the validation for this job as passed and add to list of successfully migrated jobs and continue (if they do not match then add the job to the validation failure list and collect the list of failures); (d) if the target job status does not match to source job, that is, the target job is not finished, then we need to analyze why the job is not finished (some possible reasons for this failure are: (1) the job depends on a particular environment variable and this variable might not be set in the target or have a value that is different than the source value, or (2) another scenario is that a job produces output to a file and in the target machine this output folder is not writable); (e) as a first step of analysis, fetch source side job log and parse it and collect all the environment variables used by that run and similarly fetch the target side job environment variables through target job log and compare these values and check if there are differences (if any difference is found then automatically correct the target side value with source value using a code repository of possible failure strings and a method to correct these failures, for example fixrepos block 508 shown in FIG. 5); (f) parse the target job log and extract the cause of failure (check if a fixable solution exists for this kind of failure by searching the failure string in a data store called FixFailure, if there is a fix method available for this then call/execute the method in order to fix this issue, if there is not a fix available for this type of failure then add the failure string to report and add the job to the list of failures and continue); (g) if the failure is fixed successfully then go back to sub-step a, or else add the job to a list of failures.

There are two possible scenarios during a migration—either the source machine is available after a migration or the source machine is not available after a migration (example in place migration—where the same system is used for migration). The same solution mentioned above works for both the scenarios. In the event that the source machine is not available, it is not possible to get any more data. In case the source is available, the data can be refreshed in the event that jobs have been executed on the source machine even after a migration.

Some embodiments of the present invention have one, or more, of the following features, characteristics and/or advantages: (i) completely automated tool that will compare the design information and runtime operational metadata of jobs in two different instances of an ETL product; (ii) reporting success or failure for a migrated job; (iii) provides for cases where the two instances are of the same version or different versions; (iv) exception management support; (v) a completely automated system to compare and validate the design and runtime operational metadata of two ETL jobs from two different instances of ETL application; (vi) compare and validate the migration process of an ETL job of an application; (vii) comparing ETL jobs across platforms, versions and/or releases; (viii) handles migrations that are in-place migration (the previous version does not exist) and/or online migration (where both versions exist even after a migration); (ix) generates a detailed report; and/or (x) achieve the steps even for an in-place upgrade (because data related to source side will be lost).

Figure 7:
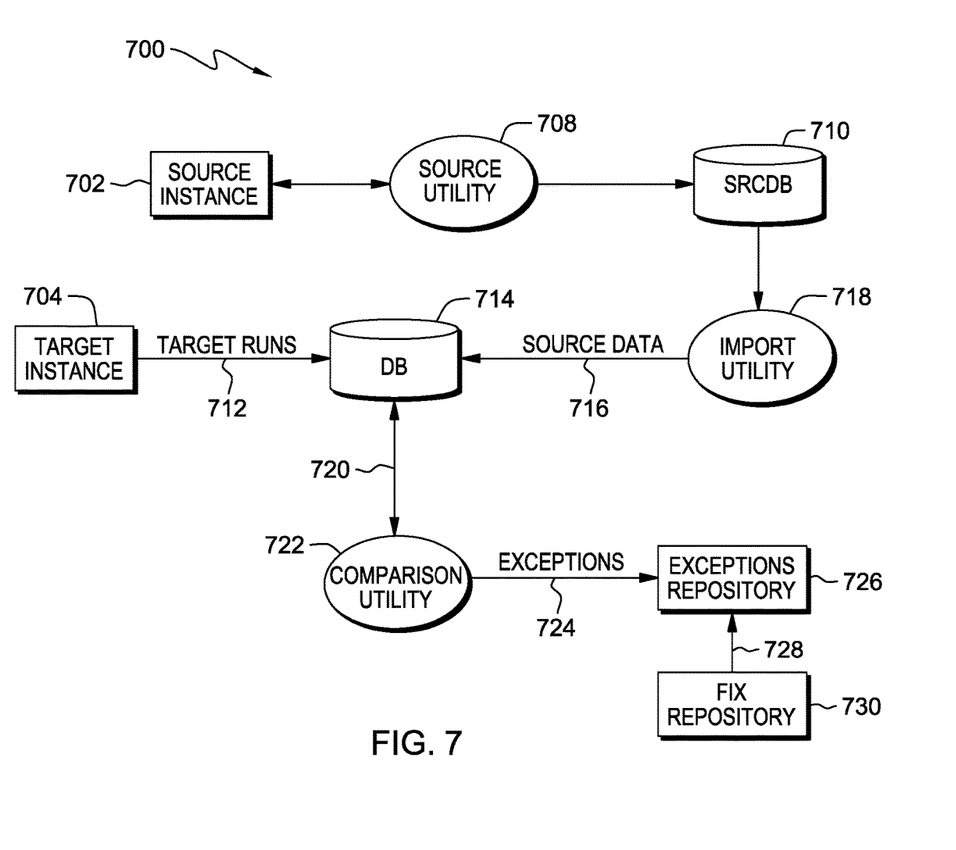
FIG. 7 is a schematic view of a third embodiment of a computer system according to the present invention.

As shown in FIG. 7, architectural diagram 700 shows an embodiment of the present disclosure, and is a bit more detailed than diagram 500 discussed, above, in connection with FIG. 5. Diagram 700 includes: source instance block 702; target instance block 704; source utility block 708, source database (SRCDB) block 710; target runs communication path 712; comparison database (DB) 714; source data communication path 716; import utility block 718; comparison communication path 720; comparison utility block 722; exceptions communication path 724; exceptions repository 726; fix communication path 728; and fix repository 730.

In operation, source instance block 702 communicates with source utility block 708. Source utility 708 sends its output data to SRCDB 710. Import utility block 718 receives operational metadata from SRCDB 710 and outputs it through source data communication path 716 to comparison database 714. Comparison database 714 also receives target runs from target instance block 704 over target runs communication path 712. The operational metadata of the target runs and source data stored in comparison database 714 by comparison utility block 722 over comparison communication path 720. This comparison yields exceptions, which are sent from comparison utility block 722 over exceptions communication path 724 to exceptions repository 726. Where feasible, fix repository 730 provides known fixes over fix communication path 728 to the exceptions repository. In this way, exceptions can be fixed automatically, substantially without human intervention and under the control of software.

High level steps for a method according to the present disclosure will now be set forth: (i) gather the runtime operational metadata and design time information from source system; (ii) store the source information in an intermediate form (this storage could be in a database, JSON file etc); (iii) gather similar information (runtime operational metadata and design time information from target system); (iv) validate the migrated jobs by comparing the source and target side job design and run time operational meta data; (v) in case of mismatches report the mismatches and fix the design mismatches by updating the target job design info in the repository; and (vi) for runtime comparison, find out the reason in case of a mismatch and automatically fix it by maintaining a code repository of failures and the fixes, and list the failures for which a fix is not available.

Details on fetching source information, under an embodiment of the present disclosure, will now be set forth: (i) connect to the source project with the supplied credentials and fetch all the jobs; (ii) for each of the jobs above, perform the "Step II Sub-Steps" set forth in the following paragraph; and (iii) migrate the jobs from the source machine to the target machine using the recommended approach (for example, using a conventional tool built into a conventional ETL software program).

The Step II Sub-Steps, mentioned above, are as follows: (a) run the job (in case the job is not compiled, it will be recorded as a failure and reported appropriately); (b) fetch the job design and runtime operational metadata (for the job design information, the repository containing the design information and the runtime operational metadata can be fetched using available APIs); and (c) load the fetched data into source database (SRCDB could be a database or a file (for example, a file in JSON format)

Details on comparison of design time information and fixing of design time mismatches, according to an embodiment of the present disclosure, will now be set forth: (i) job design information includes job name, job category, job type, job parameters, parameter types and default values, job short/long description, number of stages, stage name, stage type, stage properties, links, link meta data, data locators, etc.; (ii) this information is stored in a design repository (a relational database) in target instance; (iii) fetch the design info from SRCDB in case of source job and fetch the same information from target side repository for target job; (iv) compare each of the source side values with target values, if there is a mismatch in any of the fields or their precision, scale, data types, or parameters, then update the corresponding row of this particular job in target side tables with source side values and commit the target database; (v) fix compiler options, buffer options and so on if missing or incorrect depending on platform. Further details with respect to item (v): (a) highlight only platform specific information like Lib Path, Credentials as it can be different; and (b) allow to provide information as "Business Change" and can skip difference in future.

Details on comparison of design time information and fixing of design time mismatches, according to an embodiment of the present disclosure, will now be set forth: (i) use framework (APIs) to access the relational database and perform database operations on it. Below are the steps to fix the mismatch; and (ii) perform the following sub-steps to fix the mismatch: (a) authenticate to the domain using domain username/password, (b) get the sandbox client using the API (createSandboxClient( ), (c) load the job object into in-memory DSJobDef object (select dsj from dsj in DSJobDef where dsj.DSNameSpace='<Domain name>:<Project name>' and dsj.Name='<Job Name>'), (d) modify the mismatched fields in the in-memory object with source values, and (e) update the DSJobDef table with the API (sandboxClient.markForSave(dsJobDef) and sandboxClient.save( )).

Figure 8:
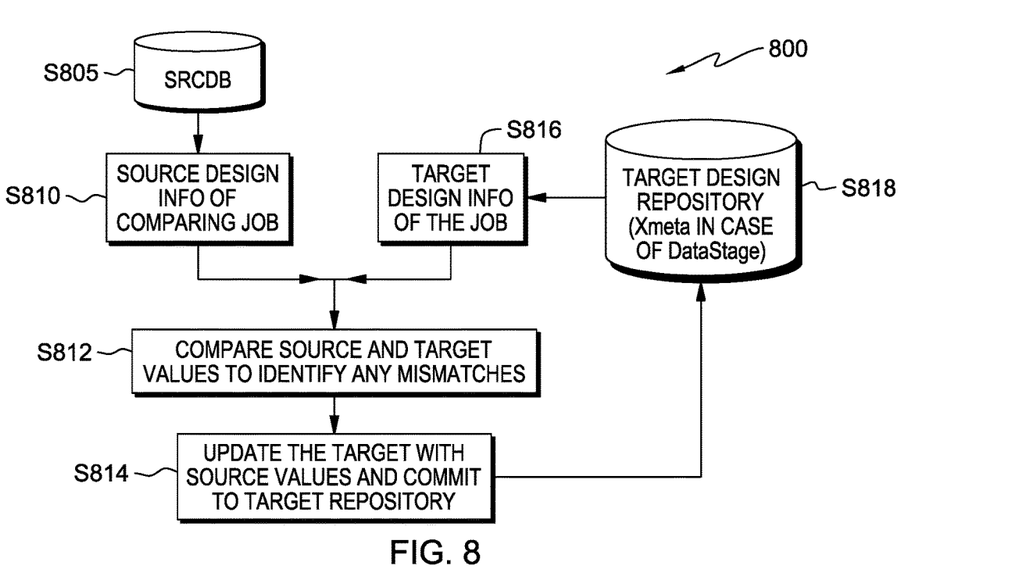
FIG. 8 is a flowchart showing a process performed, at least in part, by the third embodiment computer system.

FIG. 8 shows flowchart 800 which is a method for fixing design mismatches according to an embodiment of the present disclosure, including steps S805 to S818 with process flow between and among the steps as shown in FIG. 8.

Figure 9:
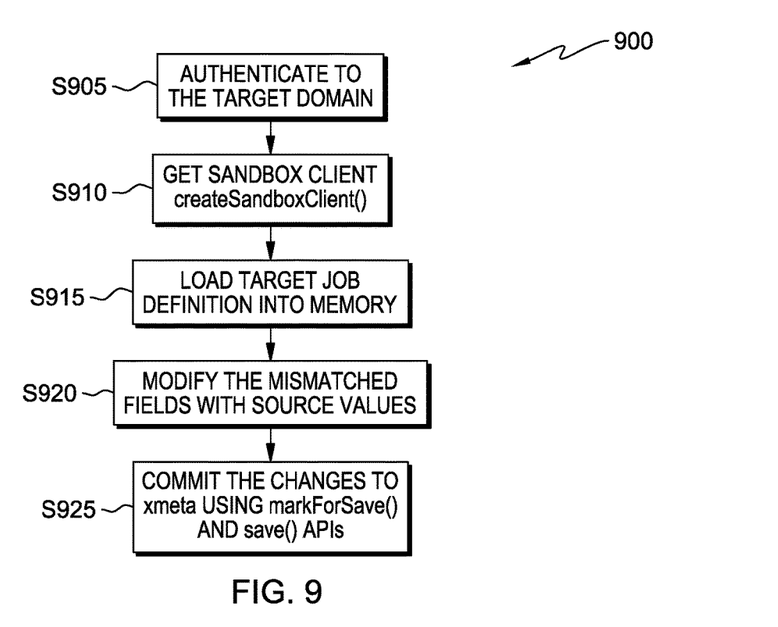
FIG. 9 is a flowchart showing a process performed, at least in part, by the first embodiment computer system.

FIG. 9 shows flowchart 900 for an update method that can be used in conjunction with method 800 of FIG. 8. Method 900 includes steps S905 to S925 with process flow between and among the steps as shown in FIG. 9.

Details on steps for comparison of run time parameters and fixing of run time mismatches according to an embodiment of the present disclosure will now be set forth: (i) job run time operational metadata includes job name and invocation id, runtime job parameters and their values, runtime environment variables, row count for each link, elapsed time, job status, job log, number of messages, etc.; (ii) query SRCDB and fetch source job's runtime operational metadata and fetch the target side details from target instance; (iii) comparison will be done for finished jobs on source instance; and (iv) check the status of target job: (a) if it is finished then compare the runtime operational metadata of source and target and list the differences if any, but (b) if it is not finished, then analyze why the job is not finished.

Details on steps for comparison of run time parameters and fixing of run time mismatches according to an embodiment of the present invention will now be set forth in the following paragraphs.

As a first step of analysis, a source side job log is fetched and parsed to collect all the environment variables used by that run. The target side job environment variables are similarly collected, through target job log, and compared to the source side environment variables to check if there are differences. If there is any mismatch, then the target side value is automatically corrected based upon the source value. Platform and product install locations and user credentials may also be considered (for example, difference highlighted), but mismatches in these parameters are not necessarily fixed because they can be a false alarm. More specifically, these mismatches are highlighted in correlation with error logs.

As a second step, the target job log is parsed to extract the cause of failure. By searching the failure string in a fix repository, the software checks to determine if there is a fixable solution to this kind of failure. The fix repository is a code repository of all known failures and associated methods to fix them.

As a third step, if there exists a fix method available for the failure, then the software calls and executes the fix method in order to fix this issue. If the failure is not fixed successfully, then the software adds the mismatch error to a validation failure list.

As a fourth step, if there exists no fix available for this type of failure, then the software adds the failure string to a report and adds the job to the list of failures.

Figure 10:
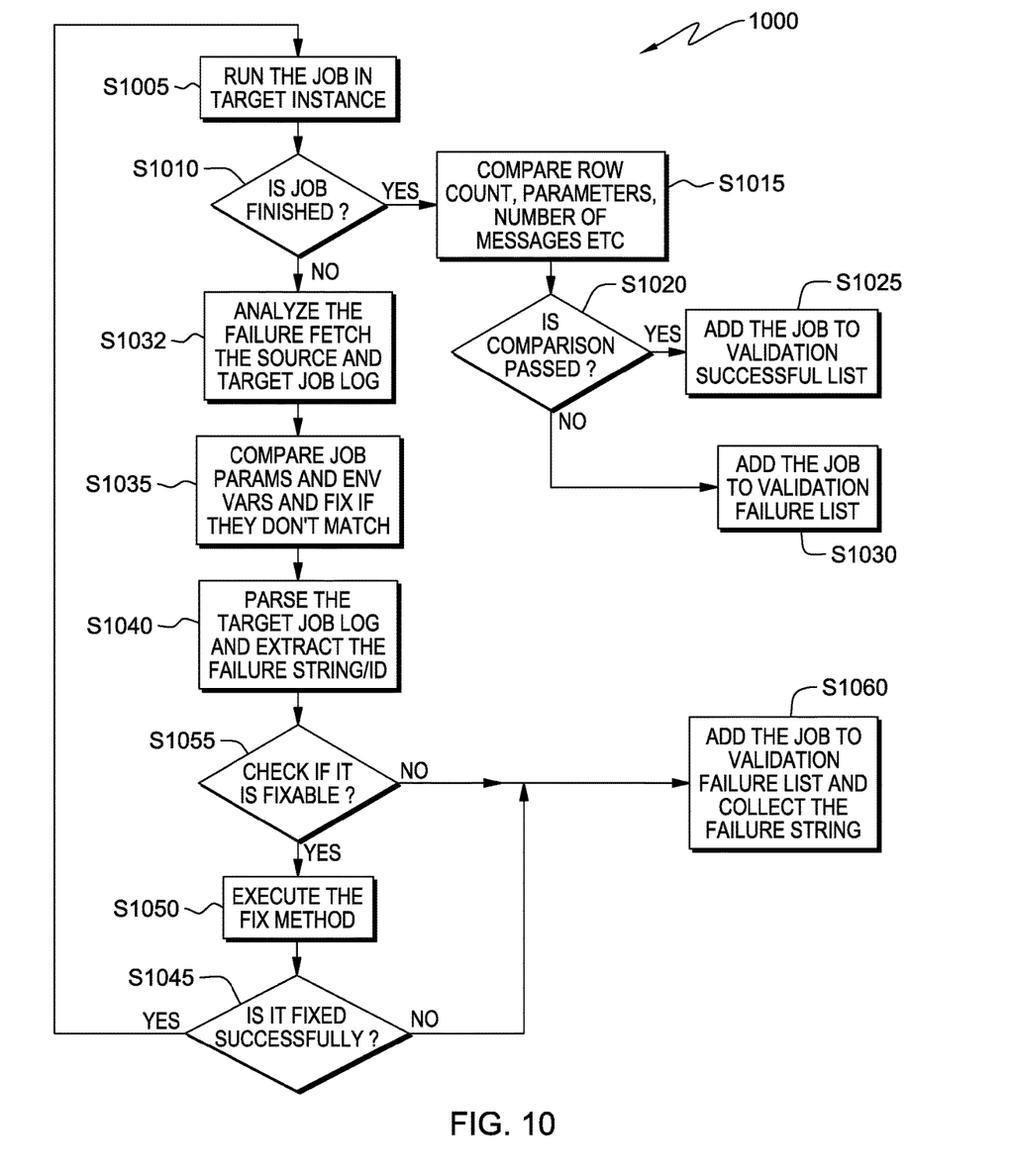
FIG. 10 is a flowchart showing a process performed, at least in part, by the third embodiment computer system.

FIG. 10 shows flowchart 1000 which is a method for fixing run time comparison differences according to an embodiment of the present disclosure, including steps S1005 to S1060 with process flow between and among the steps as shown in FIG. 10.

Some embodiments of the present invention may have one, or more, of the following features, characteristics and/or advantages: (i) system and method to achieve the comparison of job design time information across multiple versions (more than two instances across releases/platforms/offline); (ii) a way to achieve comparison of job time design information irrespective of availability of source machine (offline) and/or in place upgrade of the source instance; (iii) the source and target instances here could be of same version or different versions, platform; (iv) a mechanism to report success or failure for a migrated job and to generate a detailed report based on what has been done to each job; (v) a mechanism to provide exception management support in case of mismatches, identify the root cause and fix the job design mismatches and run time mismatches in a completely automated manner; (vi) a method to identify the root cause of run time mismatches using the job run log; (vii) a mechanism to fetch a job run log and parse it to identify the failure strings and/or identification numbers; (viii) a method to fix job design mismatches by updating a target repository; (ix) a method to fix the run time mismatches by maintaining a code repository of all possible failures and appropriate methods to fix these failures; (x) comparison can also be conducted on number of records produced with warnings thrown for rejections and/or errors; (xi) facilitates determination of a cause of a change in behavior of the job execution across releases, instances or platforms; (xii) number of records can vary across instance but warnings and rejected rows can't exceed a set limit; (xiii) if it is executed on same data as is case in the industry, should produce same records and logs; (xiv) highlights deviations, such as by extra logs to avoid failures in production system which is completely integrated until reports are issued; (xv) can highlight issues with data types and allow these issues to be fixed within batch flow; (xvi) can highlight issues with indexes based on duplicate records; (xvii) compares older releases, and cross-platforms comparison even when it was an in-place upgrade or new install with old hardware released (in both these cases the source ceases to exist and so there is no reference available); (xviii) collects relevant information into the proprietary format and makes it available to current system for performing off-line comparison; (xix) customized modules used as part of batch flow are validated; and/or (xx) highlights the difference in any used API(s) and metadata changes and/or fixes associated issues.

Some embodiments of the present disclosure may have one, or more, of the following benefits and/or areas of technical value: (i) provides an automated method to validate the migration; (ii) finds out which jobs are migrated properly and which are not; (iii) figure out the failures using the exception management module and fix them automatically wherever possible (mismatches related to design time information and runtime operational metadata); (iv) provides confidence that the jobs are behaving as appropriate after migration; (v) the same mechanism can be used in development stage, quality assurance stage and production stage validation; and/or (vi) supports in-place upgrade of the product (if the source system is not available after a migration).

Some embodiments of the present disclosure may have one, or more, of the following features, characteristics and/or advantages: (i) design time comparison of an ETL job across multiple versions of the ETL product; (ii) fixing the design time mismatches and the run time operational metadata mismatches through an exception management module; (iii) validating the design time and run time parameters for job runs across two different ETL instances and fixing the differences by incorporating exception handling modules in the case of mismatch(es); (iv) validating whether the jobs are migrated properly or not by comparing the job design information of source side job and target side job and if the target job design doesn't match with the source job design, then fixing the target job design; and/or (v) comparing the runtime operational metadata of source and target job runs, and, if any of the target job runtime information doesn't match with source, finding out the root cause of the failures and trying to fix these root causes.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

What is claimed is:

1. A method comprising:
running a first instance of a first extract-transform-load (ETL) job on a first system, with the running of the first instance including generation of first job runtime operational metadata;
running a second instance of the first ETL job on a second system, with the running of the second instance including generation of second job runtime operational metadata;
responsive to the running of the first and second instances of the first ETL job, determining existence of a job runtime issue with the running of the second instance on the second system;
responsive to the determination of existence of the job runtime issue of the second instance on the second system, creating an exception corresponding to the existence of the job runtime issue of the second instance on the second system; and
handling the exception by correcting the runtime issue with respect to the second system based on intelligent analysis of design and runtime operational metadata, including:
parsing a first runtime log generated by running the first instance and a second runtime log generated by running the second instance,
determining information about the runtime issue based on the parsing of the first and second runtime logs, and
finding out a root cause of the failure based upon the information determined about the runtime issue;
wherein the root cause is one of the following: an environment variable failure, or an output folder failure.

2. The method of claim 1 wherein the correction of the runtime issue with respect to the second system comprises:
finding a relevant fix is a fix repository; and
applying the relevant fix.

3. The method of claim 1 further comprising:
generating a new fix for correcting the runtime issue with respect to the second system based on the intelligent analysis of design and runtime operational metadata; and
adding the new fix to a fix repository along with information identifying the runtime issue with respect to the second system that lead to generation of the new fix.

4. A computer program product comprising:
a non-transitory computer-readable storage medium; and
computer readable program instructions stored on the computer-readable storage medium;
wherein the program instructions include:
first program instructions programmed to run a first instance of a first extract-transform-load (ETL) job on a first system, with the running of the first instance including generation of first job runtime operational metadata;
second program instructions programmed to run a second instance of the first ETL job on a second system, with the running of the second instance including generation of second job runtime operational metadata;
third program instructions programmed to, responsive to the running of the first and second instances of the first ETL job, determine existence of a job runtime issue with the running of the second instance on the second system;
fourth program instructions programmed to, responsive to the determination of existence of the job runtime issue of the second instance on the second system, creating an exception corresponding to the existence of the job runtime issue of the second instance on the second system; and
fifth program instructions programmed to handle the exception by correct the runtime issue with respect to the second system based on intelligent analysis of design and runtime operational metadata, including:
parsing a first runtime log generated by running the first instance and a second runtime log generated by running the second instance,
determining information about the runtime issue based on the parsing of the first and second runtime logs, and
finding out a root cause of the failure based upon the information determined about the runtime issue;

wherein the root cause is one of the following: an environment variable failure, or an output folder failure.

5. The computer program product of claim 4 wherein the correction of the runtime issue with respect to the second system comprises:
   finding a relevant fix is a fix repository; and
   applying the relevant fix.

6. The computer program product of claim 4 further comprising:
   generating a new fix for correcting the runtime issue with respect to the second system based on the intelligent analysis of design and runtime operational metadata; and
   adding the new fix to a fix repository along with information identifying the runtime issue with respect to the second system that lead to generation of the new fix.

7. A computer system comprising:
   a set of processor(s);
   a non-transitory computer-readable storage medium; and
   computer readable program instructions executable on the set of processor(s) and stored on the computer-readable storage medium;
   wherein the program instructions include:
      first program instructions programmed to run a first instance of a first extract-transform-load (ETL) job on a first system, with the running of the first instance including generation of first job runtime operational metadata,
      second program instructions programmed to run a second instance of the first ETL job on a second system, with the running of the second instance including generation of second job runtime operational metadata,
      third program instructions programmed to, responsive to the running of the first and second instances of the first ETL job, determine existence of a job runtime issue with the running of the second instance on the second system,
      fourth program instructions programmed to, responsive to the determination of existence of the job runtime issue of the second instance on the second system, creating an exception corresponding to the existence of the job runtime issue of the second instance on the second system; and
      fifth program instructions programmed to handle the exception by correct the runtime issue with respect to the second system based on intelligent analysis of design and runtime operational metadata, including:
         parsing a first runtime log generated by running the first instance and a second runtime log generated by running the second instance,
         determining information about the runtime issue based on the parsing of the first and second runtime logs, and
         finding out a root cause of the failure based upon the information determined about the runtime issue;
      wherein the root cause is one of the following: an environment variable failure, or an output folder failure.

8. The computer system of claim 7 wherein the correction of the runtime issue with respect to the second system comprises:
   finding a relevant fix is a fix repository; and
   applying the relevant fix.

9. The computer system of claim 7 further comprising:
   generating a new fix for correcting the runtime issue with respect to the second system based on the intelligent analysis of design and runtime operational metadata; and
   adding the new fix to a fix repository along with information identifying the runtime issue with respect to the second system that lead to generation of the new fix.

* * * * *